United States Patent Office 3,461,160
Patented Aug. 12, 1969

3,461,160
PREPARATION OF DICARBOXYLIC ACIDS
Eugene Dennis Wilhoit, Orange, Tex., assignor to E. I. du Pont de Nemours and Company, Wilmington, Del., a corporation of Delaware
No Drawing. Filed Apr. 28, 1966, Ser. No. 545,833
Int. Cl. C07c 51/20, 51/32
U.S. Cl. 260—533        13 Claims

ABSTRACT OF THE DISCLOSURE

A process for the oxidation of cyclic olefins to dicarboxylic acids such as 1,12-dodecanedioic acid which comprises contacting the olefins in a liquid phase reaction system comprising aqueous nitric acid and a catalyst which is a combination of osmium and vanadium at a temperature in the range 50 to 150° C. with an oxygen pressure in a range of 1–7 atmospheres.

---

This invention relates to dicarboxylic acids, and more particularly, to a process for the preparation of dicarboxylic acids from cyclic olefins.

Dicarboxylic acids are useful in the manufacture of synthetic resins, plasticizers, and industrial chemicals. The prior art teaches that cyclic olefins may be oxidized to dicarboxylic acids directly in low yield. Since the low yield might have been due to the complexity of the reaction, the art further teaches that it is desirable to conduct the oxidation in multiple stages so as to afford greater control of the products formed.

The process of the present invention provides a simple one-step high-yield method for the production of dicarboxylic acids from cyclic olefins, which consumes only small amounts of $HNO_3$. The reduction products of $HNO_3$ formed in this process (nitric oxide and nitrogen dioxide) can, by reaction with oxygen in the presence of water, be regenerated to $HNO_3$.

The process of the present invention comprises oxidizing cyclic mono-, di-, or polyolefins in a liquid-phase system comprising $HNO_3$ and osmium-vanadium catalyst. The presence of an organic solvent (for the dicarboxylic acid product) is optional. Such a solvent is desirable when the product is of limited solubility in water. This process, for example, can be employed to oxidize substituted or unsubstituted cyclic monoolefins to the corresponding dibasic acid. Likewise, cyclic diolefins can be oxidatively ruptured at each olefinic bond to form two dibasic acids of lower molecular weight and can also be ruptured at one olefinic bond to form unsaturated diacids.

Illustrative of cyclic olefins useful as starting materials in the process of this invention are those containing up to 18 carbon atoms, for example, cyclohexane, cycloheptene, cyclooctene, cyclononene, cyclodecene, cycloundecene, cyclododecene, cyclohexadiene, 1,5-cyclooctadiene, 3-methylcyclohexene, 4-methylcyclohexene, 4-vinylcyclohexene, 3-methylcyclooctene, 3-methylcyclodecene, 3-methylcyclododecene, and cis-4-cyclohexene-1,2-dicarboxylic acid.

The vanadium-osmium system can be supplied to the reaction mixture in any one of a number of forms. For example, either osmium or vanadium can be introduced as the element itself, an oxide of the element, or a salt containing the element. It is immaterial in which of the above forms osmium and vanadium are supplied to the reaction system, since oxidation occurs at once on making up the reaction ssytem as described herein. Illustrative of the chemical forms in which the catalysts can be introduced are osmium (as the element), $OsO_4$, vanadium (as the element), $V_2O_4$, $V_2O_5$, and $NH_4VO_3$ (ammonium vanadate), $K_2[OsO_4(OH)_2]$.

$HNO_3$ is introduced into the reaction system as an aqueous solution. Optionally, an organic solvent (dioxane, acetic acid, tetrahydrofuran, 2-nitropropane, or nitrocyclohexane) can be introduced into the reaction system. The preferred organic solvents in this process are dioxane and acetic acid. In the synthesis of higher molecular weight dicarboxylic acids (those containing 10–18 carbon atoms, for example) it is preferred, but not necessary, that an organic solvent be present to ensure that all materials are maintained in the liquid phase. Usually when lower molecular weight olefins are employed as the starting material, organic solvents are not required.

The amount of $HNO_3$, $H_2O$, vanadium element, and osmium element present is expressed in terms of the relative weights of each in the reaction system, based upon 100 parts. Organic starting materials and products, organic solvents, and any other material present (such as the remainder of the compound in which the catalysts were introduced, if not introduced as the element itself) do not form part of this calculation. The amount of olefin and solvent employed is expressed as parts per 100 parts of the system mentioned above.

$HNO_3$ can comprise 10–70 parts (by weight) of the above-mentioned 100 part system, preferably 25–50 parts thereof. The amounts of vanadium and osmium, expressed as the amount of the element present, are vanadium, 0.01–0.7 part, preferably 0.1–0.5 part; and osmium, 0.01–5.0 parts, preferably 0.5–2.5 parts. Thus the relative amount of water is 24–90 parts. Should the presence of an organic solvent be desirable, the amount thereof can be varied widely, depending upon the particular reaction system. With the preferred organic solvent, dioxane, generally no more than 100 parts of dioxane are present. It may be desirable to add to the reaction system dicarboxylic acids, such as adipic acid, to increase the solubility of the organic materials, For example, due to cosolubility effects, cyclohexene seems to be more soluble in an aqueous solution of adipic acid than in water alone.

The relative amount of olefin present in the process of this invention at any given point should be controlled, whether a batch or continuous method is employed. In either event, slow continuous admission of olefin is preferred, so that there is never present at any point during the process more olefin than osmium on a molar basis. Should an excess of olefin be present, a reaction with $HNO_3$ would probably ensue, with diminution of yield. The heat of reaction can be better controlled with a slow admission of olefin.

The process of this invention can be carried out as a batch-type operation or in a continuous manner.

A typical continuous process useful in this invention comprises feeding aqueous $HNO_3$ (and, optionally, an organic solvent) and the olefin into a stirred, heated reaction mixture described above. An aqueous solution comprising mainly $HNO_3$ and dibasic acid(s) is drawn from the reactor. If the aqueous solution is sufficiently concentrated in dicarboxylic acid, the solution can be cooled, if necessary, to 50–70° C. to precipitate out the dicarboxylic acid product(s). The solid product is separated by filtration and the aqueous filtrate is recycled. The aqueous filtrate can optionally be concentrated in a still prior to recycling.

When the process of the present invention is conducted on a batch basis, it is generally preferred that olefin be introduced into a stirred aqueous solution of $HNO_3$ and osmium-vanadium catalyst (and organic solvent, if any), the solution being held at reaction temperature. Olefin and osmium can optionally be premixed prior to addition of acid.

The temperature, time, and composition of the reaction system are interrelated, and a degree of latitude is available in selecting these process variables. The temperature of the process can be in the range 50–150° C. The preferred temperature range is 60–120° C.

The process of this invention can optionally be carried out in the presence or absence of oxygen. Pressures of oxygen of up to several hundred p.s.i. can be employed in this process. Conveniently maintained oxygen pressures are in the range from about 1–7 atmospheres, i.e., up to about 100 p.s.i. Air can be employed as the source of oxygen in this process. In this event the oxygen pressure referred to herein is the partial pressure of oxygen in air.

The presence of oxygen (as the element or as air) over the olefin oxidation process incorporates the advantage of regenerating $HNO_3$ in situ simultaneously with the olefin oxidation. By applying oxygen pressure to the oxidation system, NO is very rapidly converted to $NO_2$, which subsequently reacts with $H_2O$ to form $HNO_3$. Since the major off-gases from the olefin oxidation of this process are NO and $NO_2$, applying oxygen to the system thus sharply reduces the amount of off-gas from the reactor. This method of operation, therefore, has the advantage of requiring the handling of less off-gas. This effect reduces the equipment cost. This mode of operation is applicable to either batch or continuous oxidations.

The duration of the reaction can be varied widely, but with the normal process conditions of this invention is generally of the order of a few minutes to several hours.

When a cyclic olefin with two or more olefinic bonds is employed as the starting material, and it is desired to rupture less than all of the olefinic bonds therein, the order of addition of reactants and catalyst to the reaction system is important. For example, just one of the olefinic bonds of cyclododecatriene can be ruptured as follows. An equimolar amount of cyclododecatriene and $OsO_4$ is dissolved in dioxane and then hydrogenated in the presence of the osmium by conventional means (for example, as in Example IX). The resulting mixture is then introduced into the oxidation system of aqueous $HNO_3$ and vanadium, and 1,12-dodecanedioic acid is recovered by filtration.

In order that the invention may be better understood, the following detailed examples are given in addition to the examples already given above. All parts and percentages herein are expressed by weight unless otherwise stated.

Example I

The composition of the reaction mixture is noted in the table. Osmium was introduced as $OsO_4$, vanadium as $V_2O_5$. About 40 ml. of the mixture was placed in a flask and heated to 70° C. with stirring. Cyclohexene (0.735 gram) was injected continuously at that temperature below the surface of the agitated mixture over a period 1½ hours. The temperature of the solution was then raised to 105° C. for 10 minutes to complete the reaction and volatize out of the system any unreacted olefin. After the product was cooled to room temperature, water was added and a portion of the solution was analyzed by liquid chromatography (see table for relative weights of reactants and yield of major products based on amount of olefin charged). From the remainder of the solution, dibasic acid products were then isolated by crystallization and identified.

The amount of gaseous product ($N_2$ and $N_2O$) not useful in regeneration of $HNO_3$ corresponded to the consumption of 0.15 gram of $HNO_3$ per mole of adipic acid produced.

Examples II–X

The procedure of these examples was that of Example I, except for modification as noted in the Table. The total volume of the aqueous solution of $HNO_3$, osmium and vanadium varied between 20 and 40 ml. Note that in Examples II, V, and VI dioxane was present, in Example IX 2-nitropropane was employed, and in Example X acetic acid was present.

Example XI

Dioxane (10 ml.) and 2 ml. of cis,trans,trans-cyclododecatriene were mixed at room temperature. A solution of one gram of $OsO_4$ in 10 ml. dioxane was added slowly with stirring to the former solution. Then 3 ml. of water and 0.2 gram of platinum black were added. The mixture was heated to 90° C. At that temperature 45 p.s.i.g. of hydrogen was applied over the solution and hydrogen was maintained there until no decrease in hydrogen pressure was noted for a period of an hour.

The solution of the hydrogenated product was then slowly injected into an oxidation medium, 25 ml. of a solution of 50 parts of $HNO_3$, 50 parts of water, and 0.3 part of vanadium, which was held at 85° C. The temperature was held at 80–90° C. for an hour. The product was found to comprise a molar yield of 1,12-dodecanedioic acid of about 70% based on the olefin.

Example XII

This experiment illustrates the use of a pressure of oxygen substantially higher than atmospheric.

Into a 500-ml. glass bottle there was introduced 80 ml. (94.4 grams) of a solution of the following composition: 30 parts $HNO_3$, 68.5 parts $H_2O$, 0.18 part vanadium, and 1.3 parts osmium. Vanadium had been introduced into the solution as $V_2O_5$ and osmium as $OsO_4$. Cyclohexene (0.850 part) was introduced to this solution at room temperature. Then 49 p.s.i. of oxygen was applied to the system. The temperature of the reaction system was raised to 80° C. and held at that temperature for 20 minutes. The product comprised 88 mole percent adipic acid.

TABLE.—ONE-STEP OXIDATION OF CYCLIC OLEFINS TO DICARBOXYLIC ACIDS

| Example | Olefin, parts by wt. | Reaction medium | | | | | Temp., °C. | Time, hr. | Molar yield of acids, percent |
|---|---|---|---|---|---|---|---|---|---|
| | | $HNO_3$ | $H_2O$ | Org. Solv.,[1] parts by wt. | Vanadium | Osmium | | | |
| I | Cyclohexene (1.60) | 25 | 73 | | 0.5 | 1.5 | 70 | 1½ | 89 adipic, 3.7 glutaric, 3.0 succinic. |
| II | Cyclododecene (1.81) | 49 | 49 | 64D | 0.3 | 1.3 | 75 | 1 | 70 1,12-dodecanedioic, 4 undecanedioic, 6 decanedioic. |
| III | Cyclododecene (2.35) | 50 | 50 | | 0.3 | [3] | 75 | 1 | 86 1,12-dodecanedioic. |
| IV | Cycloheptene (2.40) | 40 | 59 | | 0.4 | 0.9 | 80 | 1½ | 65 pimelic. |
| V | Cyclooctene (3.05) | 39 | 59 | 97D | 0.4 | 1.0 | 80 | 1 | 82 suberic. |
| VI | 3-methylcyclohexene (6.05) | 32 | 64 | 61D | 0.5 | 3 | 90 | 1 | 81 2-methyladipic. |
| VII | 4-methylcyclohexene (2.40) | 52 | 47 | | 0.2 | 1 | 70 | 1 | 80 3-methyladipic. |
| VIII | 1,5-cyclooctadiene (2.18) | 40 | 58 | | 0.3 | 2 | 55 | 1 | 30 succinic. |
| IX | Cyclohexene (2.51) | 39 | 59 | 77N | 0.2 | 2.3 | 75 | 1 | 83 adipic, 9 glutaric, 6 succinic. |
| X | Cyclododecene (0.852) | 50 | 48 | 100A | 0.3 | 1.6 | 75 | 1 | 70 dodecanedioic. |

[1] D is dioxane, N is 2-nitropropane, and A is acetic acid.
[2] Reaction mixture also contained 33 parts of adipic acid.
[3] In this example equimolar amounts of $OsO_4$ and olefin were premixed in dioxane at 25° C.

The data found in the examples demonstrate that the process of this invention can be employed to oxidize cyclic olefins to dicarboxylic acids in high yield, often over 80%. This improvement in yield over the prior art processes is accomplished in a one-step process. Furthermore, the process consumes very little nitric acid.

The low yields reported in the art for the HNO₃ oxidation of cyclic olefins to dibasic acids are due, at least in part, to the reaction of the olefin with NO₂ to give mono- and dinitro compounds. The latter compounds are only slowly oxidized in low yield to the corresponding dibasic acid.

In contrast, with the vanadium-osmium catalyst system of this invention, the predominant role of HNO₃ is the secondary one of regenerating the osmium-vanadium catalyst. The rate of reaction of the catalyst with olefin and intermediates is much faster than the rate of reaction of HNO₃/NO₂ with the olefin and subsequent intermediates. Due to this difference in reaction rates, the oxidation of olefin to acid is largely effected by the osmium-vanadium system.

Since relatively little of the oxidation of the cyclic olefin is due to the action of HNO₃/NO₂, the consumption of HNO₃ (with formation of N₂ and N₂O) is very low also. The major gaseous products arising from the regeneration of osmium and vanadium by HNO₃ are NO and NO₂. These latter products can be used to regenerate HNO₃, whereas, N₂O and N₂ produced in significant amounts according to the prior art processes, are considered to be "spent" and are discarded.

It is within the contemplation of this invention that the dicarboxylic acids might not always remain in solution, but the product may be removed from the reaction vessel as a heterogeneous mixture.

The foregoing detailed description has given for clearness of understanding only, and no unnecessary limitations are to be understood therefrom. The invention is not limited to the exact details shown and described since obvious modifications will occur to those skilled in the art.

I claim:

1. A process for the oxidation of cyclic olefins to dicarboxylic acids in which the oxidation is effected by contacting said olefins with a liquid-phase reaction system comprising aqueous HNO₂ and an osmium-vanadium catalyst.

2. The process according to claim 1 wherein said oxidation is carried out under a pressure of oxygen of about 1-7 atmospheres, whereby HNO₃ is regenerated from reduction products thereof.

3. The process according to claim 1 in which the reaction system comprises aqueous HNO₃, an osmium-vanadium catalyst, and dioxane.

4. The process according to claim 1 in which the reaction system comprises aqueous HNO₃, an osmium-vanadium catalyst, and acetic acid.

5. The process according to claim 1 in which the reaction system comprises aqueous HNO₃, an osmium-vanadium catalyst, and 2-nitropropane.

6. The process according to claim 1 wherein said oxidation is carried out at a temperature in the range 50–150° C. and an oxygen pressure of about 1–7 atmospheres.

7. The process according to claim 6 wherein the temperature of said oxidation is in the range 60–120° C.

8. The process according to claim 7 wherein said olefin is introduced into a reaction system comprising 10–70 parts by weight of HNO₃, 0.01–0.7 part of vanadium, 0.01–5.0 parts of osmium, and 24–90 parts of water.

9. The process according to claim 8 wherein the reaction system comprises 25–50 parts of HNO₃, 0.1–0.5 part of vanadium, 0.5–2.5 parts of osmium, and 47–74 parts of water.

10. The process according to claim 8 wherein cyclohexene is oxidized to adipic acid.

11. The process according to claim 8 wherein cyclododecene is oxidized to 1,12-dodecanedioic acid.

12. The process according to claim 1 wherein said cyclic olefin has at least two olefinic bonds and said olefin is oxidized to a saturated dicarboxylic acid of the same number of carbon atoms as said olefin, said process including the steps of
    (a) hydrogenating a solution of osmium and said olefin in dioxane until the consumption of hydrogen has ended, and
    (b) oxidizing the resulting solution with an aqueous solution of HNO₃ and vanadium.

13. The process according to claim 12 wherein said olefin is cyclododecatriene and said saturated dicarboxylic acid is 1,12-dodecanedioic acid.

References Cited
UNITED STATES PATENTS

| | | | |
|---|---|---|---|
| 3,306,932 | 2/1967 | Davis | 260—533 |
| 2,323,861 | 7/1943 | Zellner | 260—533 |
| 3,317,592 | 5/1967 | Machean et al. | 260—533 |

LORRAINE A. WEINBERGER, Primary Examiner

D. STENZEL, Assistant Examiner

PO-1050
(5/69)

UNITED STATES PATENT OFFICE
CERTIFICATE OF CORRECTION

Patent No. 3,461,160　　　　　　　　Dated August 12, 1969

Inventor(s) EUGENE DENNIS WILHOIT

It is certified that error appears in the above-identified patent and that said Letters Patent are hereby corrected as shown below:

Column 5, line 39, CLAIM 1, " $HNO_2$ " should be -- $HNO_3$ --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents